US011040692B2

(12) United States Patent
Lohmann et al.

(10) Patent No.: US 11,040,692 B2
(45) Date of Patent: Jun. 22, 2021

(54) MULTI-VENT PASSENGER SIDE AIRBAG INFLATOR

(71) Applicant: ARC AUTOMOTIVE, INC., Knoxville, TN (US)

(72) Inventors: Scott Lohmann, Lenoir City, TN (US); Rebekah Reid, Lenoir City, TN (US); James Rose, Knoxville, TN (US); Robert Zimbrich, Knoxville, TN (US)

(73) Assignee: ARC Automotive, Inc., Knoxville, TN (US)

( * ) Notice: Subject to any disclaimer, the term of this patent is extended or adjusted under 35 U.S.C. 154(b) by 79 days.

(21) Appl. No.: 16/547,715

(22) Filed: Aug. 22, 2019

(65) Prior Publication Data

US 2021/0053527 A1  Feb. 25, 2021

(51) Int. Cl.
| | |
|---|---|
| *B60R 21/272* | (2006.01) |
| *B60R 21/017* | (2006.01) |
| *B60R 21/217* | (2011.01) |
| *B60R 21/26* | (2011.01) |
| *B60R 21/261* | (2011.01) |

(52) U.S. Cl.
CPC .......... *B60R 21/272* (2013.01); *B60R 21/017* (2013.01); *B60R 21/2171* (2013.01); *B60R 21/26* (2013.01); *B60R 21/261* (2013.01); *B60R 2021/2612* (2013.01); *B60R 2021/26029* (2013.01)

(58) Field of Classification Search
CPC . B60R 21/272; B60R 21/017; B60R 21/2171; B60R 21/26; B60R 21/261; B60R 2021/26011; B60R 2021/26029; B60R 2021/2612
See application file for complete search history.

(56) References Cited

U.S. PATENT DOCUMENTS

| | | | |
|---|---|---|---|
| 5,423,570 A | 6/1995 | Kort et al. | |
| 5,516,147 A | 5/1996 | Clark et al. | |
| 5,558,367 A | 9/1996 | Cuevas | |
| 5,564,742 A | 10/1996 | Clark et al. | |

(Continued)

FOREIGN PATENT DOCUMENTS

| | | | |
|---|---|---|---|
| CN | 109677353 A | * | 4/2019 |
| CN | 209581405 U | * | 11/2019 |
| WO | WO 98/09851 | | 3/1998 |

*Primary Examiner* — Paul N Dickson
*Assistant Examiner* — Scott F. Underwood
(74) *Attorney, Agent, or Firm* — Nixon & Vanderhye P.C.

(57) ABSTRACT

An airbag inflator includes a pressure vessel with a bottom portion, a top portion and a center structure connecting the bottom portion and the top portion. The top portion includes an exit orifice that is closed with a rupturable membrane. An energetics cover attached to the center structure houses a pyrotechnic material, and a diverter is attached to the top portion. The pressure vessel, the energetics cover and the diverter define a gas flow path from inside the energetics cover toward the bottom portion of the pressure vessel, the gas flow path turning at least a first 180 degrees toward the top portion of the pressure vessel and between the energetics cover and the pressure vessel. The longer gas flow path allows time for multi-perforation grain slivers to burn up before exiting the inflator, thereby reducing the amount of particulate exiting the inflator.

16 Claims, 14 Drawing Sheets

(56) References Cited

U.S. PATENT DOCUMENTS

| | | | |
|---|---|---|---|
| 5,584,506 A | * | 12/1996 | Van Wynsberghe ........................ B60R 21/261 280/736 |
| 5,588,676 A | | 12/1996 | Clark et al. |
| 5,601,308 A | * | 2/1997 | Cuevas ................. B60R 21/272 222/3 |
| 5,651,563 A | | 7/1997 | Cuevas |
| 5,670,738 A | | 9/1997 | Storey et al. |
| 5,778,509 A | | 7/1998 | Hamilton et al. |
| 5,851,027 A | | 12/1998 | DiGiacomo et al. |
| 5,851,028 A | | 12/1998 | Thibodeau |
| 5,851,030 A | | 12/1998 | Johnson et al. |
| 6,089,602 A | | 7/2000 | Bardroff |
| 6,189,922 B1 | | 2/2001 | Parks et al. |
| 6,199,906 B1 | | 3/2001 | Trevillyan et al. |
| 6,409,214 B2 | | 6/2002 | Katsuda et al. |
| 6,474,684 B1 | | 11/2002 | Ludwig et al. |
| 6,598,901 B2 | | 7/2003 | Nakashima et al. |
| 6,913,285 B2 | | 7/2005 | Rink et al. |
| 6,945,561 B2 | | 9/2005 | Nakashima et al. |
| 6,966,578 B2 | | 11/2005 | Smith |
| 7,172,214 B2 | | 2/2007 | Matsuda et al. |
| 7,287,474 B2 | | 10/2007 | Whitley |
| 7,380,820 B2 | | 6/2008 | O'Loughlin et al. |
| 7,506,891 B2 | | 3/2009 | Quioc et al. |
| 7,597,353 B2 | | 10/2009 | Smith et al. |
| 7,722,078 B2 | | 5/2010 | Yamazaki |
| 7,726,687 B2 | | 6/2010 | Hoffman et al. |
| 7,806,954 B2 | | 10/2010 | Quioc |
| 8,162,350 B1 | | 4/2012 | Parkinson et al. |
| 8,333,154 B2 | | 12/2012 | Fukuyama et al. |
| 8,708,367 B2 | | 4/2014 | Duvacquier et al. |
| 8,720,944 B2 | | 5/2014 | Kobayashi et al. |
| 8,827,308 B1 | | 9/2014 | Lewis et al. |
| 8,894,096 B2 | | 11/2014 | Fischer |
| 8,939,225 B2 | | 1/2015 | Cox et al. |
| 9,221,420 B2 | | 12/2015 | Laubacher et al. |
| 9,682,259 B2 | | 6/2017 | Sampson |
| 10,173,633 B2 | | 1/2019 | Last et al. |
| 2002/0053788 A1 | * | 5/2002 | Iwai .................... B60R 21/2644 280/736 |
| 2012/0326423 A1 | | 12/2012 | Hoffman |

* cited by examiner

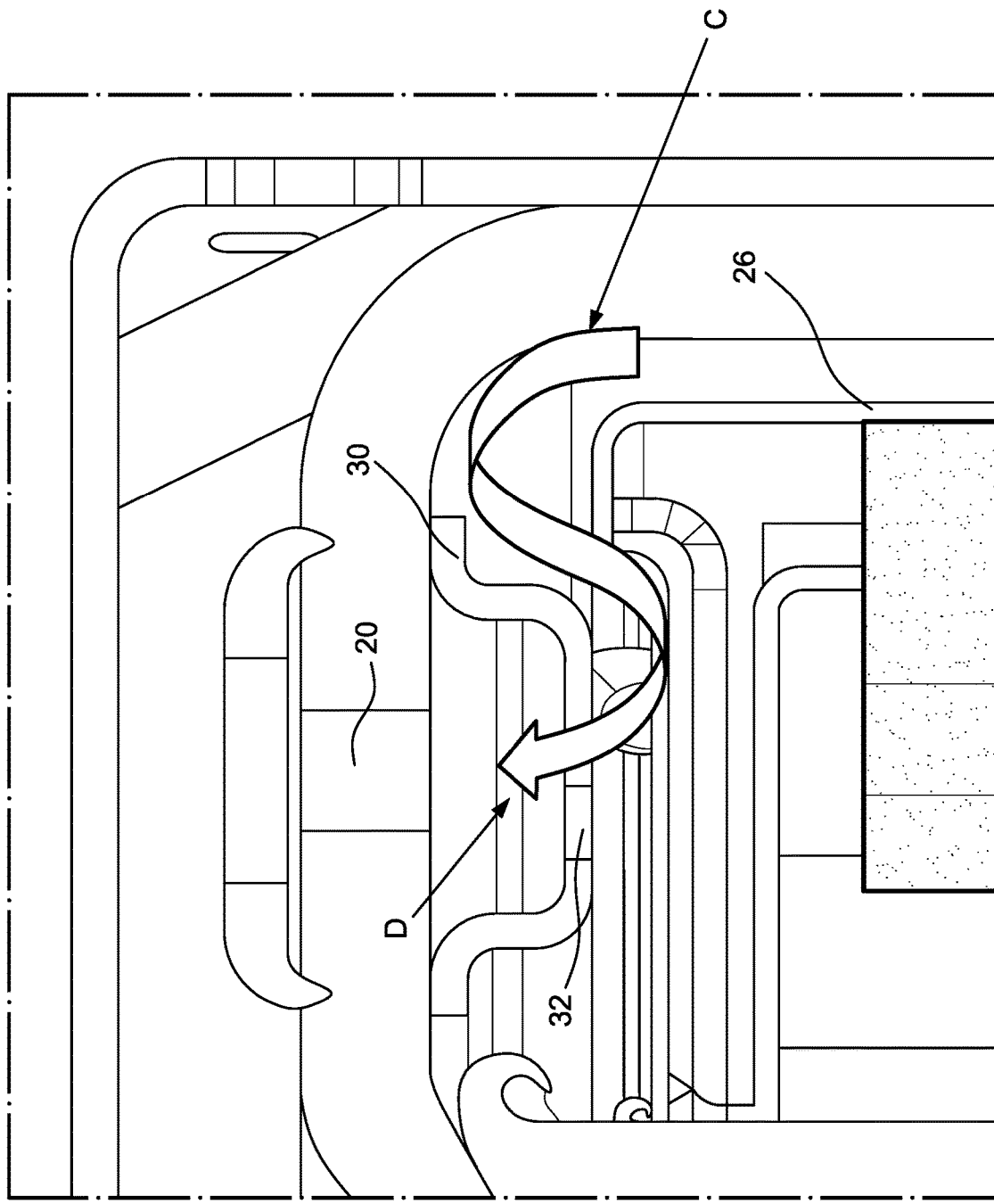

MULTI-VENT PASSENGER SIDE AIRBAG INFLATOR

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND

The invention relates to a hybrid automotive airbag inflator and, more particularly, to a hybrid automotive airbag inflator with multiple orifices, a longer tortuous flow path, and the ability to provide different performance outcomes using the multiple orifices.

Hybrid automotive airbag inflators contain both stored gas and pyrotechnic materials. The pyrotechnic materials are used for gas generation and heating of the stored gas. Some hybrid inflator designs use the stored gas vessel to contain both the high pressure gas and the pyrotechnic material, which allows for a smaller inflator size. The main pyrotechnic material in some hybrid inflators is ammonium nitrate-based, which generates very low particulate levels. Hybrid inflators using ammonium nitrate-based generants did not require a great deal of particulate filtering due to the low particulate weight generated by ammonium nitrate-based generants. With ammonium nitrate-based generants becoming unacceptable for usage in automotive airbag inflator applications, non-ammonium nitrate containing generants are now required. The typical non-ammonium nitrate-based pyrotechnic material generates 25% to 35% by weight particulate that needs to be filtered out of the gas so it does not reach the airbag or vehicle occupant.

Hybrid inflator ammonium nitrate replacement pyrotechnic materials are designed to fit directly in place of the original material, but the inflator now requires a method to keep the particulate inside the inflator. It would be desirable to provide a configuration to remove the particulate with the existing inflator design such that a new inflator design is not required.

Additionally, the current passenger inflator exhausts through one orifice which is centrally located on the axis of the inflator. There is a possibility this one orifice could be blocked by some object that would reduce or prevent the timely release of gas from the inflator to the airbag.

BRIEF SUMMARY

The inflator design of the described embodiments creates multiple orifices to reduce the effects of an object blocking any one orifice, moves the orifice away from potential sources of material that could result in a block, and utilizes an internal diverter component designed to protect the multiple orifices from any material that could potentially cause a blockage condition.

In addition, the described inflator design will create a unique flow path that changes direction multiple times. The longer, more torturous flow path reduces the overall amount of particulate exiting the inflator. The length of the flow path also allows more time for the last small pieces of burning propellant (propellant slivers) to complete the burning process before exiting the inflator. Both of these advantages reduce the risk of pin holes in the airbag cushion.

The addition of the second, third, etc. orifices allow for a multitude of different inflator performance outcomes. As an example, it is possible that only a portion of the orifices will open in a cold temperature condition in order to keep efficiencies maximized. Other examples may be different orifices open at different pressures to change the mass flow rate at any given time during the deployment event.

In an exemplary embodiment, an airbag inflator includes a pressure vessel with a bottom portion, a top portion and a center structure connecting the bottom portion and the top portion. The top portion includes an exit orifice that is closed with a rupturable membrane. An energetics cover attached to the center structure houses a pyrotechnic material. A diverter is attached to the top portion. The pressure vessel, the energetics cover and the diverter define a gas flow path from inside the energetics cover toward the bottom portion of the pressure vessel, where the gas flow path turns a first 180 degrees toward the top portion of the pressure vessel and between the energetics cover and the pressure vessel.

The energetics cover and the diverter may further define the gas flow path turning a second 180 degrees toward the bottom portion of the pressure vessel and between the energetics cover and the diverter, and turning a third 180 degrees into the diverter toward the exit orifice.

The diverter may be shaped corresponding to the top portion of the pressure vessel and may define a channel across an inside surface of the top portion. The diverter may include perforations in a bottom surface thereof. The pressure vessel may be toroidal. The top portion of the pressure vessel may include a plurality of exit orifices, where each of the exit orifices is closed with a rupturable membrane.

The airbag inflator may also include a pyrotechnic holder disposed within the energetics cover and attached to one of the center structure, the energetics cover and the bottom portion of the pressure vessel. The pyrotechnic holder may be provided with a plurality of legs supporting the pyrotechnic material. The pyrotechnic material may be shaped in three connected cylinders with respective central openings, where the pyrotechnic material may be secured on the plurality of legs via the central openings.

The energetics cover may include an open-ended cylinder with an open end facing the bottom portion of the pressure vessel and a closed end including a center aperture for attachment to the center structure of the pressure vessel. The closed end may include an indentation facing the diverter, where a space between the indentation and the diverter may form part of the gas flow path turning a second 180 degrees toward the bottom portion of the pressure vessel and in the space between the energetics cover and the diverter. The energetics cover and the diverter may further define the gas flow path turning a third 180 degrees into the diverter toward the exit orifice. The energetics cover may include axial channels on an outside diameter defining a portion of the gas flow path between the energetics cover and the pressure vessel.

In another exemplary embodiment, an airbag inflator includes a toroidal pressure vessel with a bottom portion, a top portion and a center structure connecting the bottom portion and the top portion, an energetics cover attached to the center structure that houses a pyrotechnic material, and a diverter attached to the top portion. The top portion may include a plurality of exit orifices that are each closed with a rupturable membrane. The pressure vessel, the energetics cover and the diverter define a gas flow path from inside the energetics cover toward the bottom portion of the pressure vessel, where the gas flow path makes a plurality of 180 degree turns to thereby extend the gas flow path.

BRIEF DESCRIPTION OF THE DRAWINGS

These and other aspects and advantages will be described in detail with reference to the accompanying drawings, in which:

FIG. 3B is a close-up view of the gas flow path leading to the exit orifice;

DETAILED DESCRIPTION

Figure 1:
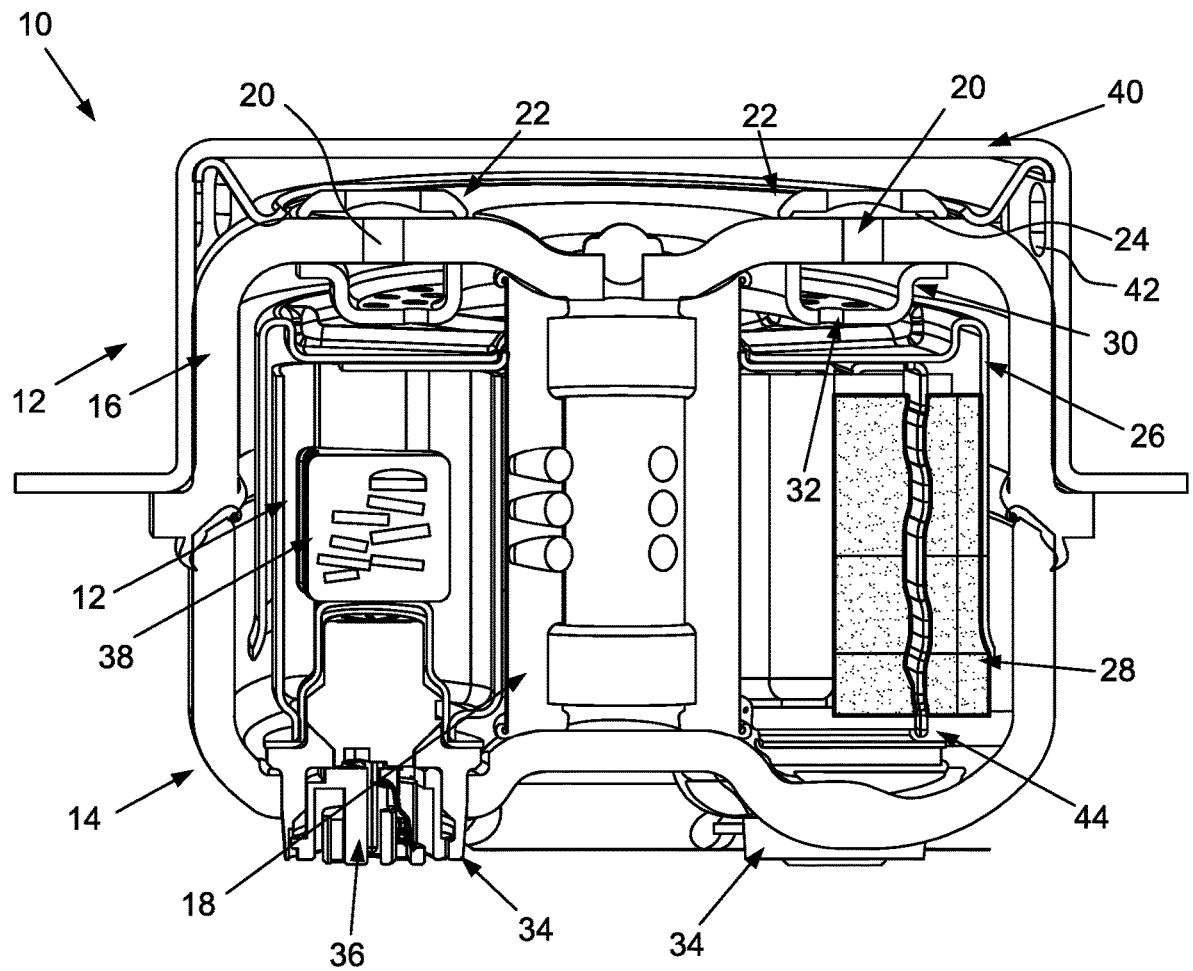
FIG. 1 is a sectional view of a multi-vent passenger side airbag inflator.
Figure 2A:
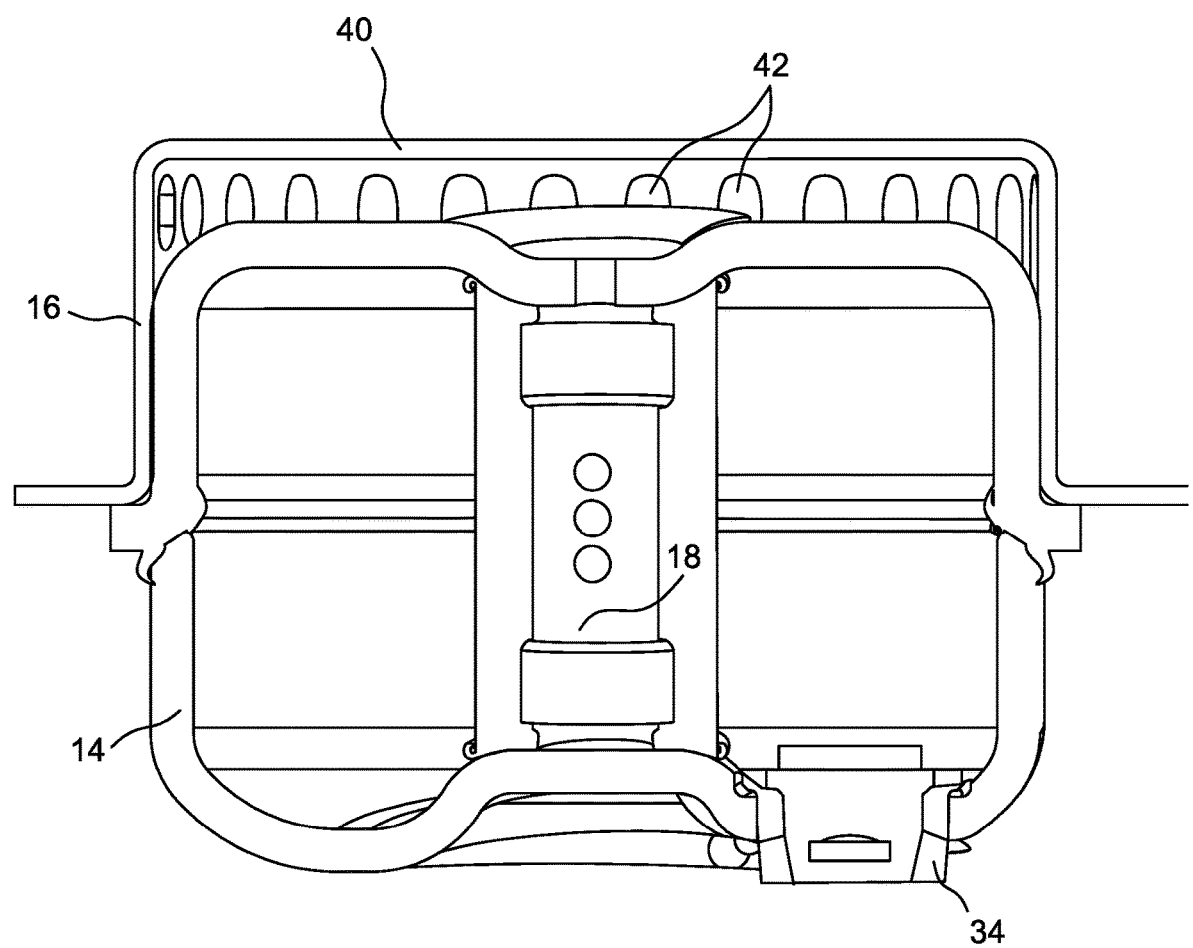
FIGS. 2A and 2B show the pressure vessel structure.
Figure 2B:
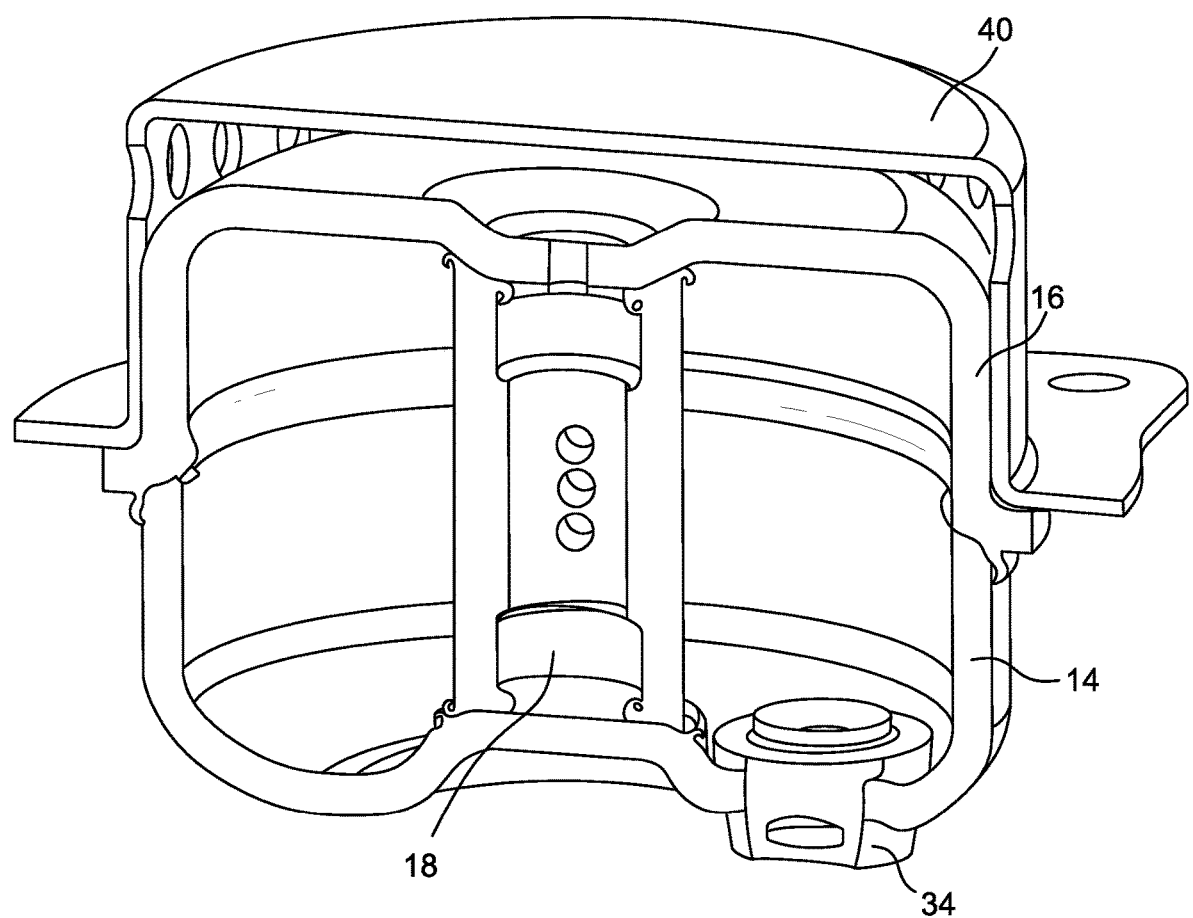
Figure 2C:
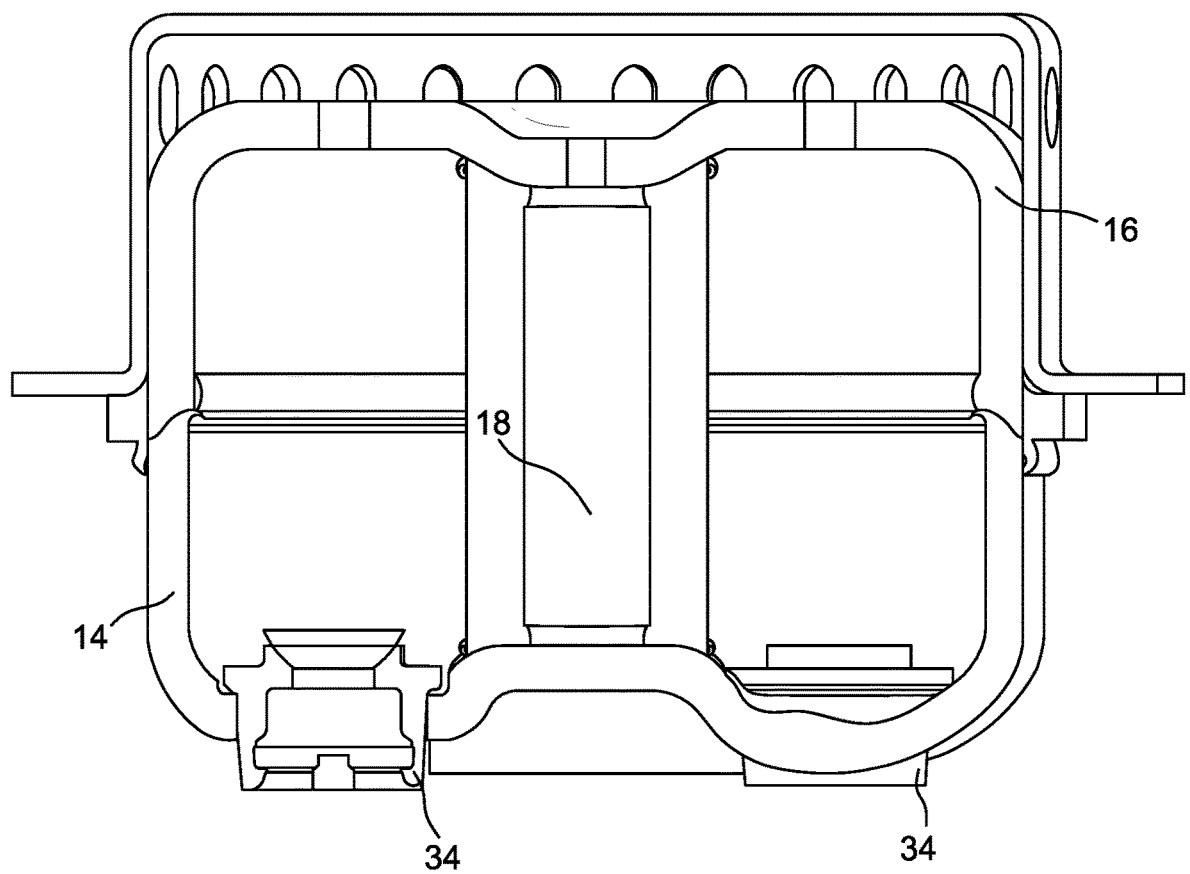
FIGS. 2C and 2D show the pressure vessel structure with two initiators.
Figure 2D:
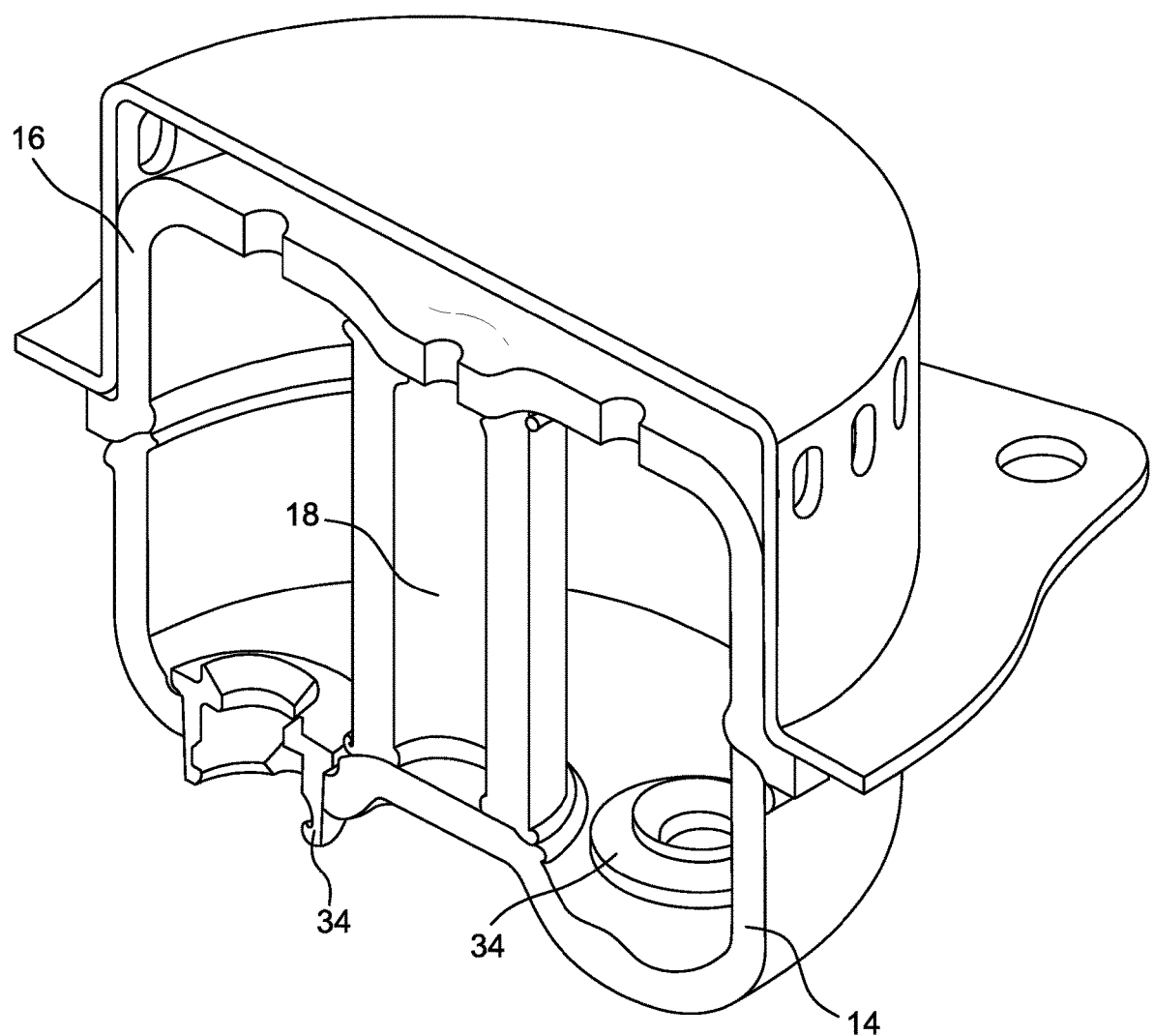

FIG. 1 is a sectional view of an airbag inflator 10 of an exemplary embodiment. FIG. 1 is sectioned in different portions of an exemplary toroidal-shaped pressure vessel 12 to show the various components contained in the pressure vessel. FIGS. 2A and 2B show the pressure vessel structure. The pressure vessel 12 includes a bottom portion 14, a top portion 16 and a center structure 18 connecting the bottom portion 14 and the top portion 16. The top portion 16 includes at least one exit orifice 20 that is closed with a rupturable membrane 24 forming part of a disc assembly 22. The inflator 10 could be single level (including one initiator) as shown in FIGS. 2A and 2B or dual level (including two initiators) as shown in FIGS. 1, 2C and 2D.

Figure 6A:
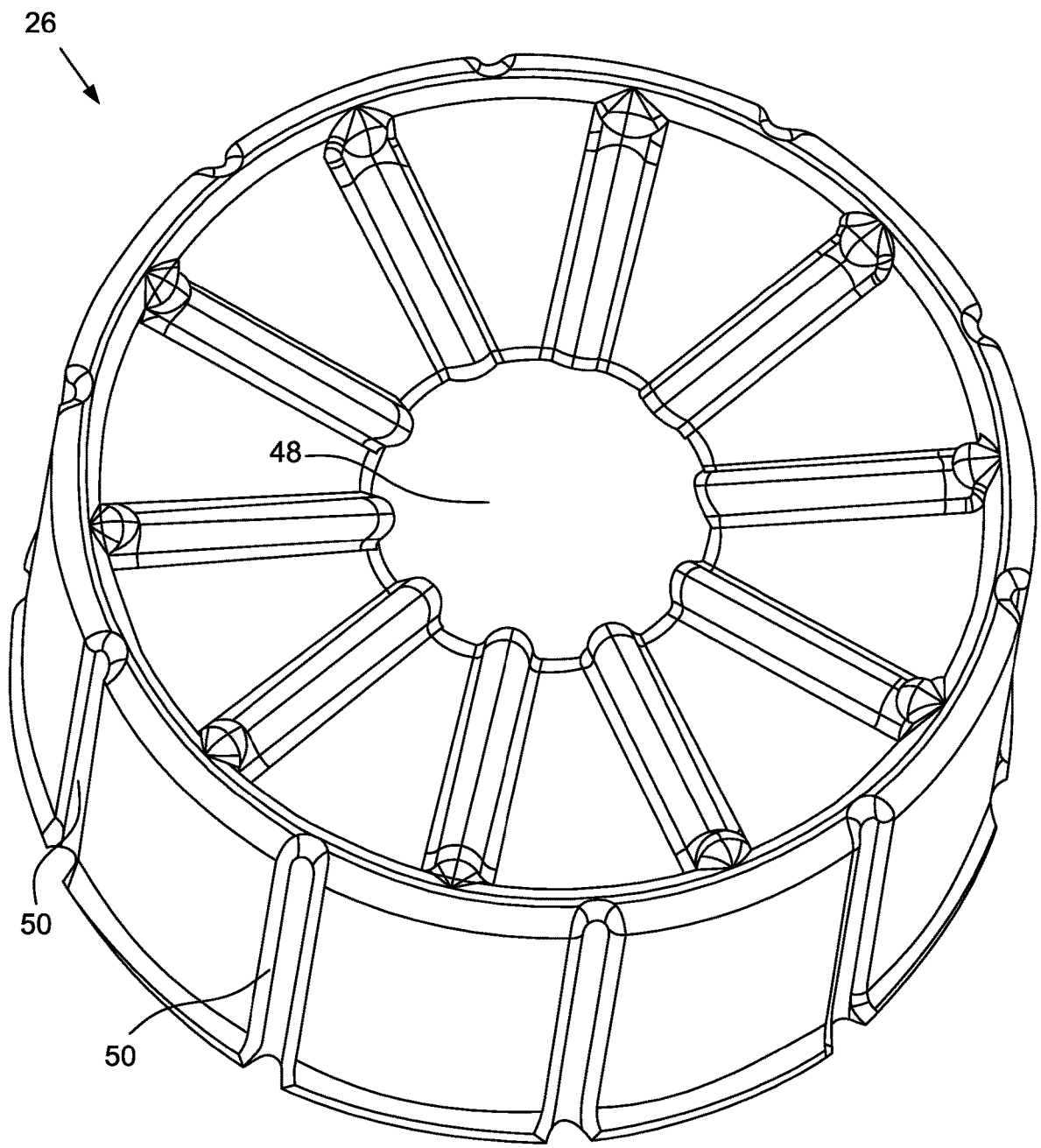
FIGS. 6A and 6B show exemplary energetics covers.
Figure 6B:
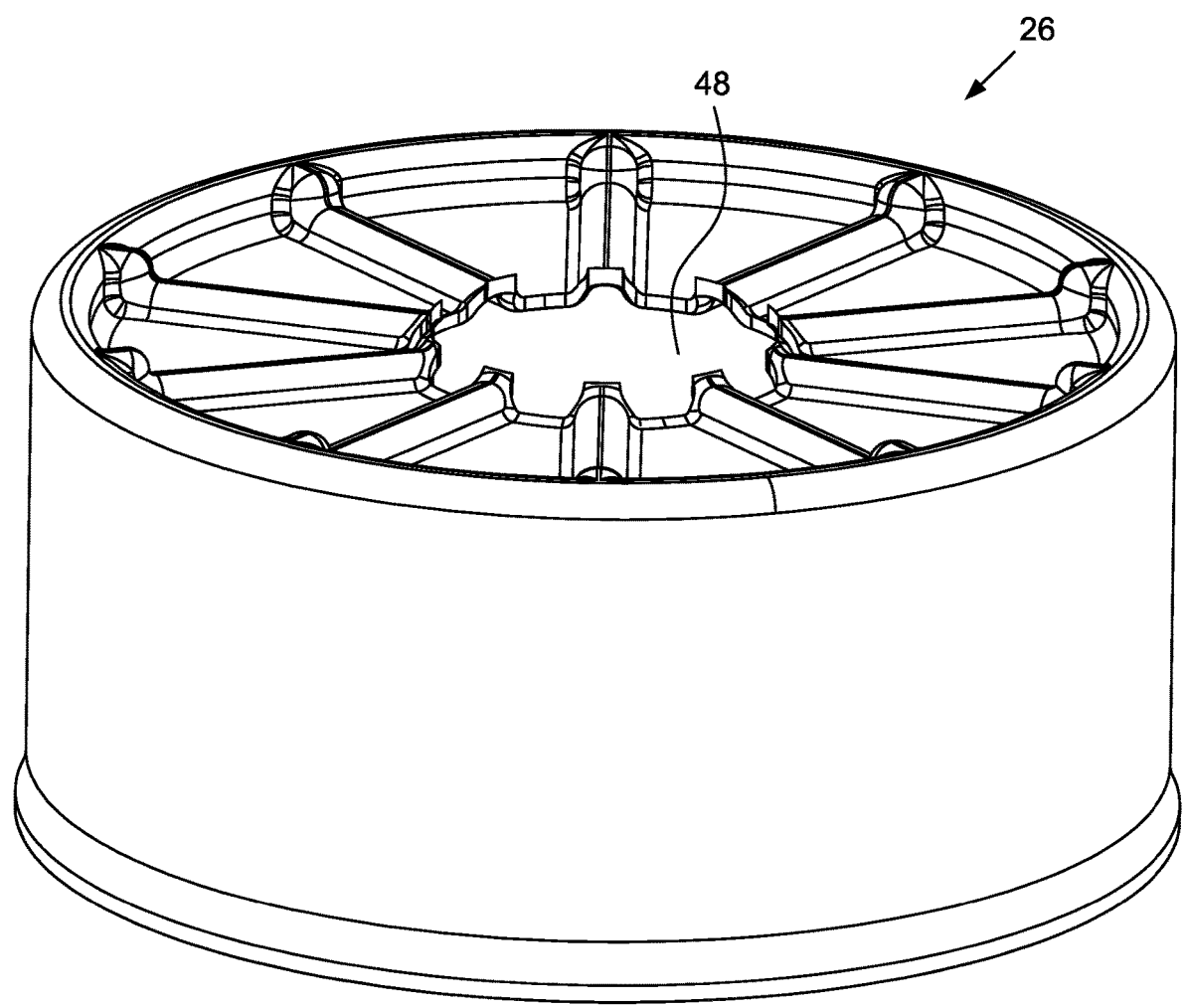

An energetics cover 26 is attached to the center structure 18 and houses a pyrotechnic material 28. The pyrotechnic material 28 fills in the space around the center structure 18. FIGS. 6A and 6B show exemplary energetics covers 26. As shown, the energetics cover 26 includes an open-ended cylinder with an open end facing the bottom portion 14 of the pressure vessel 12 and a closed end including a center aperture 48 for attachment to the center structure 18 of the pressure vessel 12.

Figure 4A:
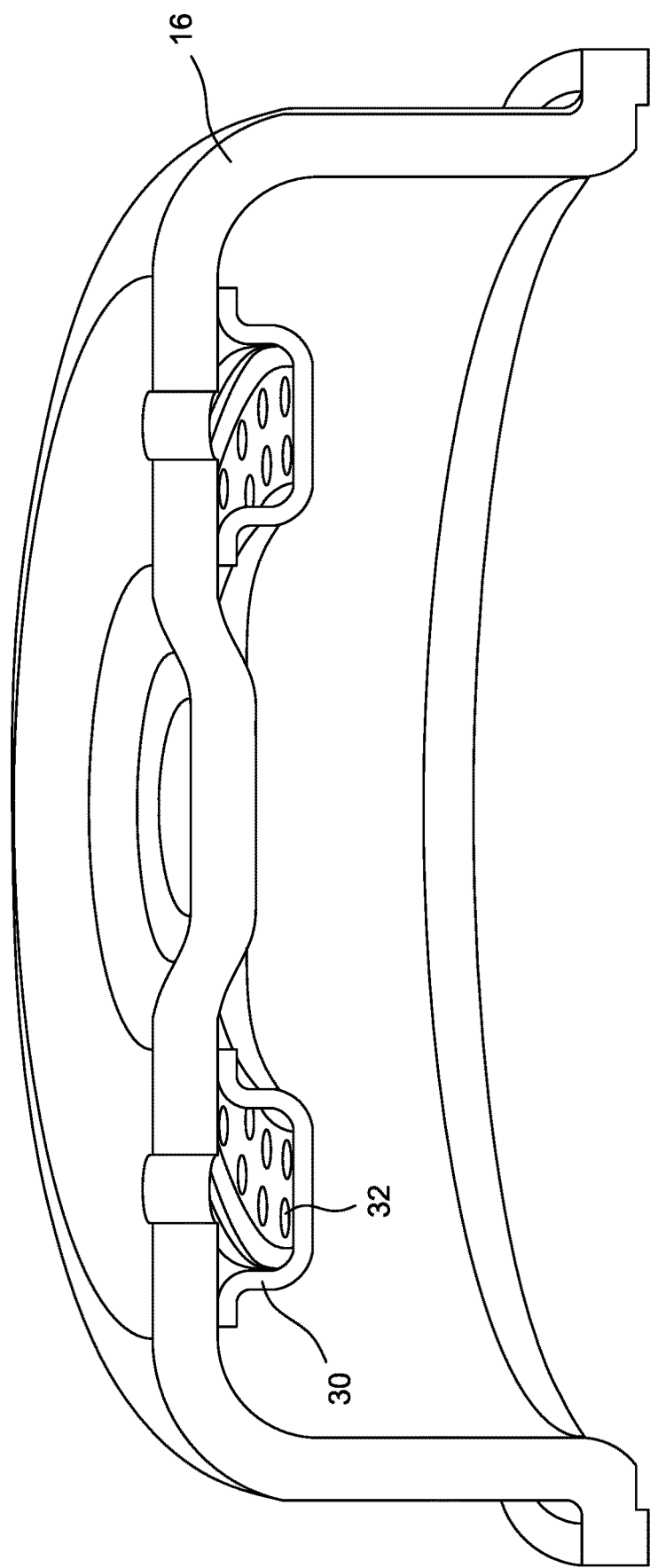
FIGS. 4A-4C show variations of the top portion of the pressure vessel with a diverter attached.
Figure 4B:
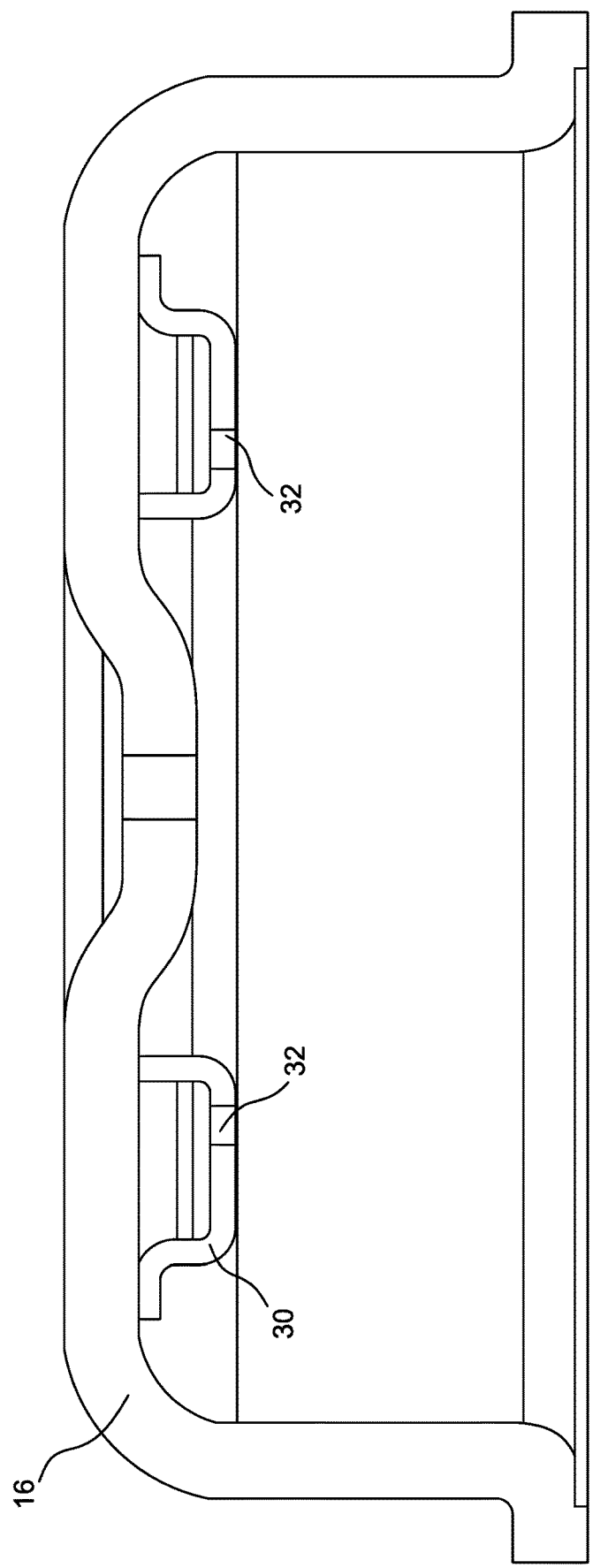
Figure 4C:
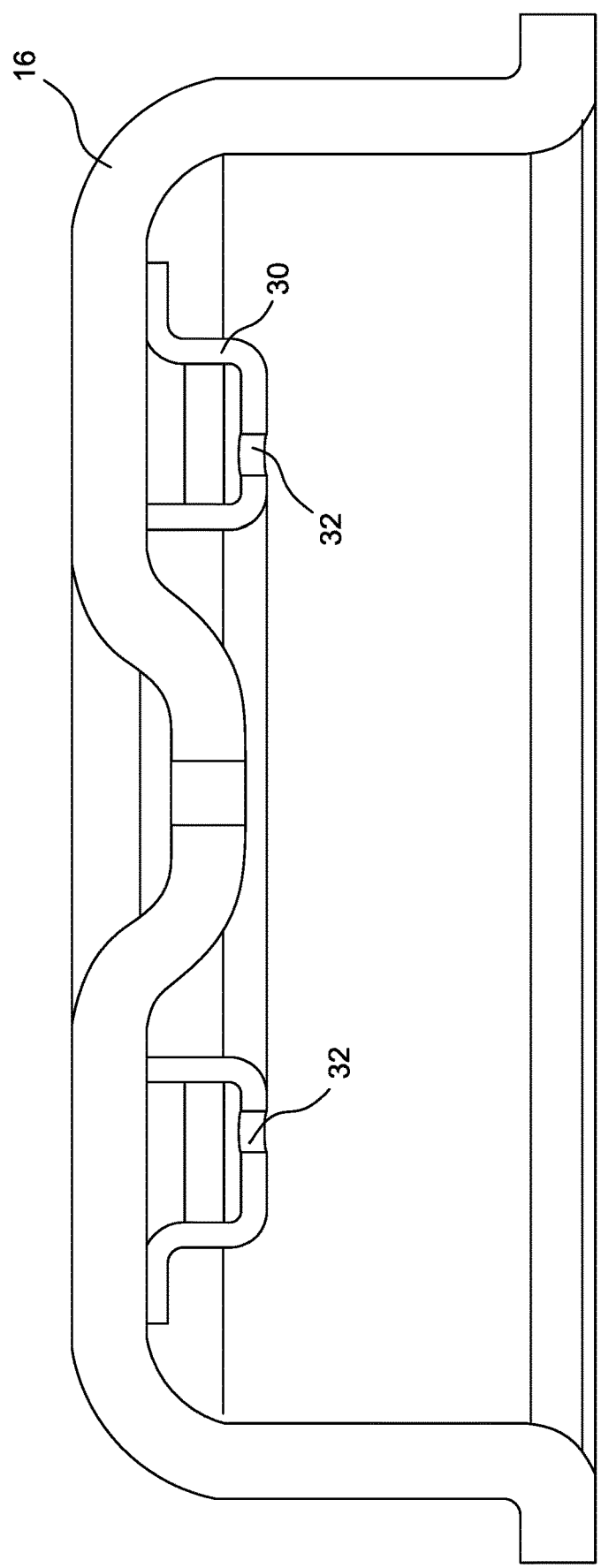

A flow diverter 30 is attached to the top portion 16 of the pressure vessel 12. The flow diverter 30 preferably includes a plurality of apertures or perforations 32 in a bottom surface thereof. The apertures or perforations 32 may be in the form of slots or the like and may alternatively or additionally be formed in the side walls of the diverter 30. The flow diverter 30 prevents large particles from reaching the exit orifices 20. With reference to FIGS. 4A-4C, the diverter 30 is preferably shaped corresponding to the top portion 16 of the pressure vessel 12 and defines a channel across an inside surface of the top portion 16. FIG. 4A shows an exemplary diverter 30 including a plurality of perforations 32. FIGS. 4B and 4C show a single row of perforations 32. In FIG. 4B, the center section of the top portion 16 is shallower than the center section of the top portion 16 in FIG. 4C.

As discussed in more detail below, the pressure vessel 12, the energetics cover 26 and the diverter 30 define a gas flow path from inside the energetics cover 26 through one or more 180 degree turns and through the exit orifices 20. As shown in FIG. 6A, the energetics cover 26 may include a plurality of axial channels 50 on an outside diameter that define a portion of the gas flow path between the energetics cover 26 and the pressure vessel 12.

Figure 5A:
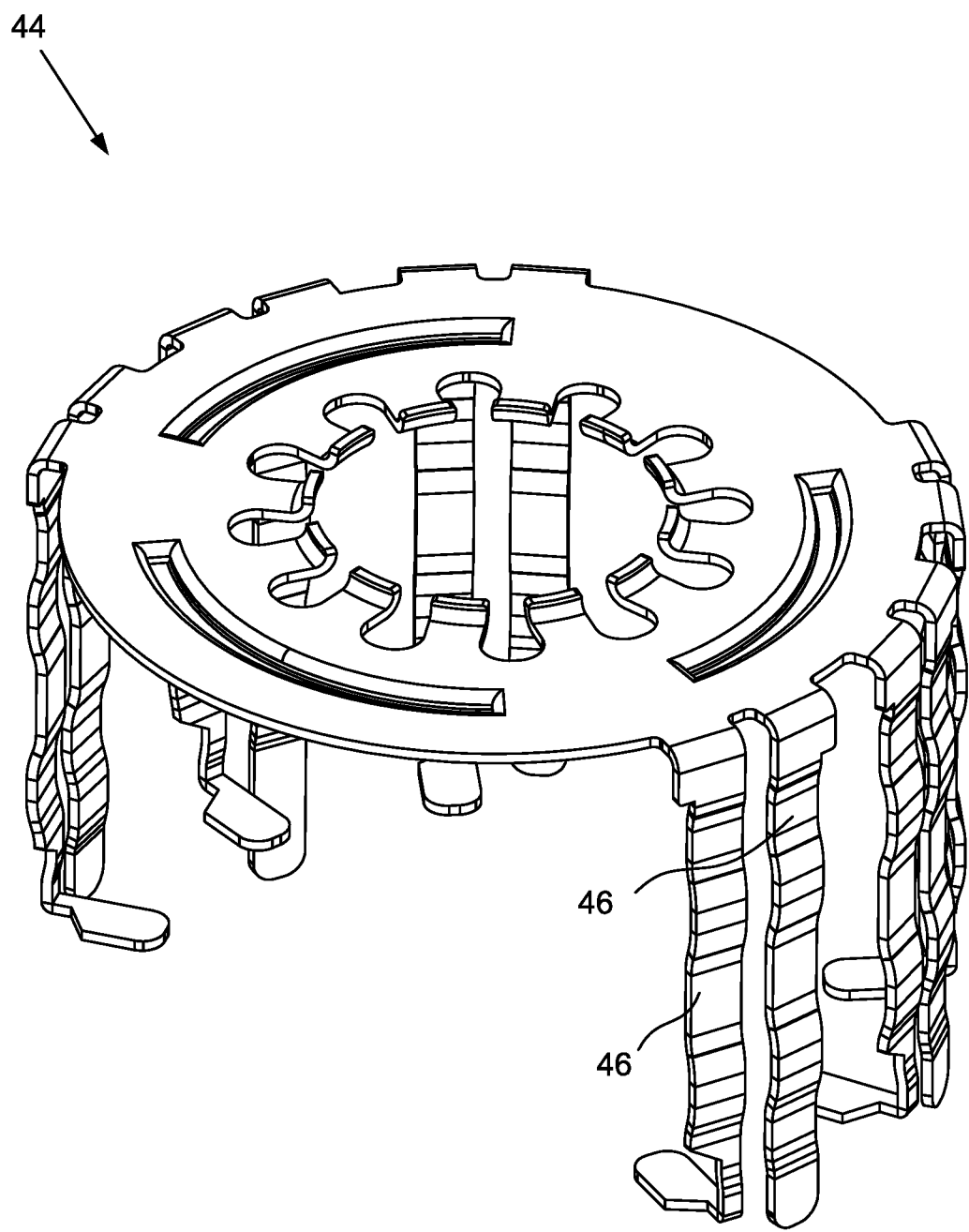
FIG. 5A shows a multi-legged pyrotechnic holder.
Figure 5B:
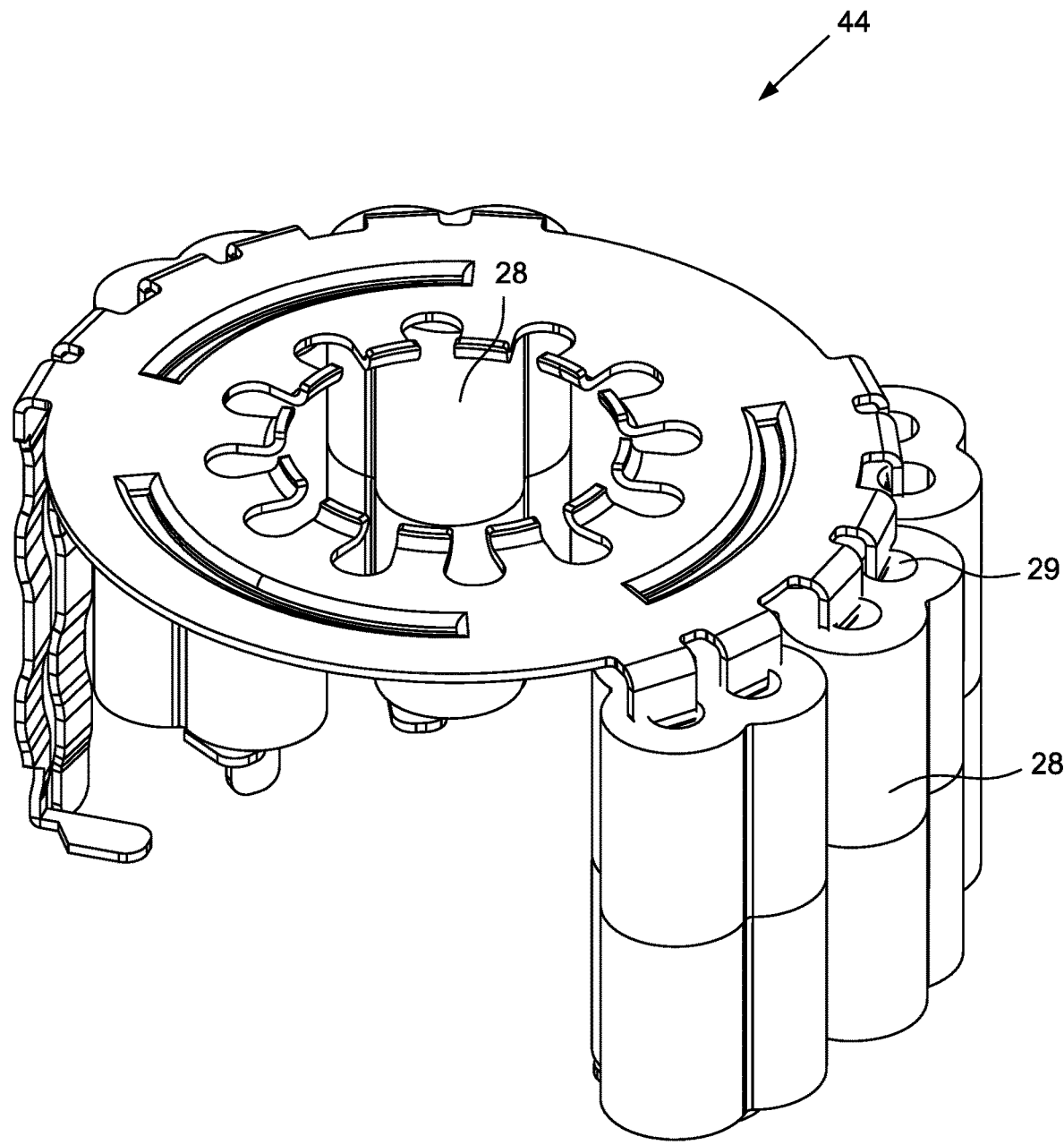
FIG. 5B shows the pyrotechnic holder of FIG. 5A with exemplary pyrotechnic material attached.

A multi-legged pyrotechnic holder 44 is disposed within the energetics cover 26 and is attached to one of the center structure 18, the energetics cover 26 and the bottom portion 14 of the pressure vessel 12. As shown in FIGS. 5A and 5B, the pyrotechnic holder 44 includes a plurality of legs 46 supporting the pyrotechnic material 28. The pyrotechnic holder 44 is shown supporting the pyrotechnic material 28 in FIG. 5B.

With continued reference to FIG. 5B, the pyrotechnic material 28 may be shaped into three connected cylinders with respective central openings 29. The pyrotechnic material 28 is secured to the plurality of legs 46 via the central openings. The three connected cylinders or lobes along with their respective openings of the pyrotechnic material 28 are configured to create a neutral burn-back (burning surface area remains constant as the grain burns) across all the pyrotechnic material. The advantage of the neutral burn compared to a regressive burn (surface area decreasing) like tablets is that pyrotechnic gas generation is lower initially and higher towards the end of the burn. In hybrid inflators, the inflator internal maximum operating pressure occurs early in the burn event so the lower burning surface area reduces the internal operating pressure allowing for lower weight inflator structure and a more controlled inflator output reducing the impact on the module and automobile instrument panel. The higher surface area towards the end of the burn improves combustion efficiency reducing the likelihood of nitrous oxide or carbon monoxide formation from the pyrotechnic material.

The bottom portion 14 of the pressure vessel 12 includes an initiator support subassembly 34 (two shown in FIG. 1) that secures an inflator initiator 36. In operation, the application of an electrical current to the inflator initiator 36 causes ignition of the pyrotechnic material 28 via a booster material 38. Heat and gas generated from the ignited pyrotechnic material 28, along with any stored gas in the pressure vessel 12 combine to increase the internal pressure in the inflator 10. The increased pressure in the pressure vessel 12 causes the rupturable membranes 24 to break. The inflation gas then flows into an exhaust manifold 40 then into the airbag (not shown) to be inflated via manifold apertures 42.

As noted, the main pyrotechnic material in some hybrid inflators was ammonium nitrate-based, which generated very high gas yield (e.g., 90-93%) and very low particulate levels (e.g., 7-10% ash). Hybrid inflators using ammonium nitrate-based generants thus did not require a great deal of particulate filtering. Recently, ammonium nitrate-based generants have become less acceptable for usage in automotive airbag inflator applications. Non-ammonium nitrate-containing generants, however, have a lower gas yield, resulting in a greater amount of particulate that needs to be filtered out of the gas.

Figure 3A:
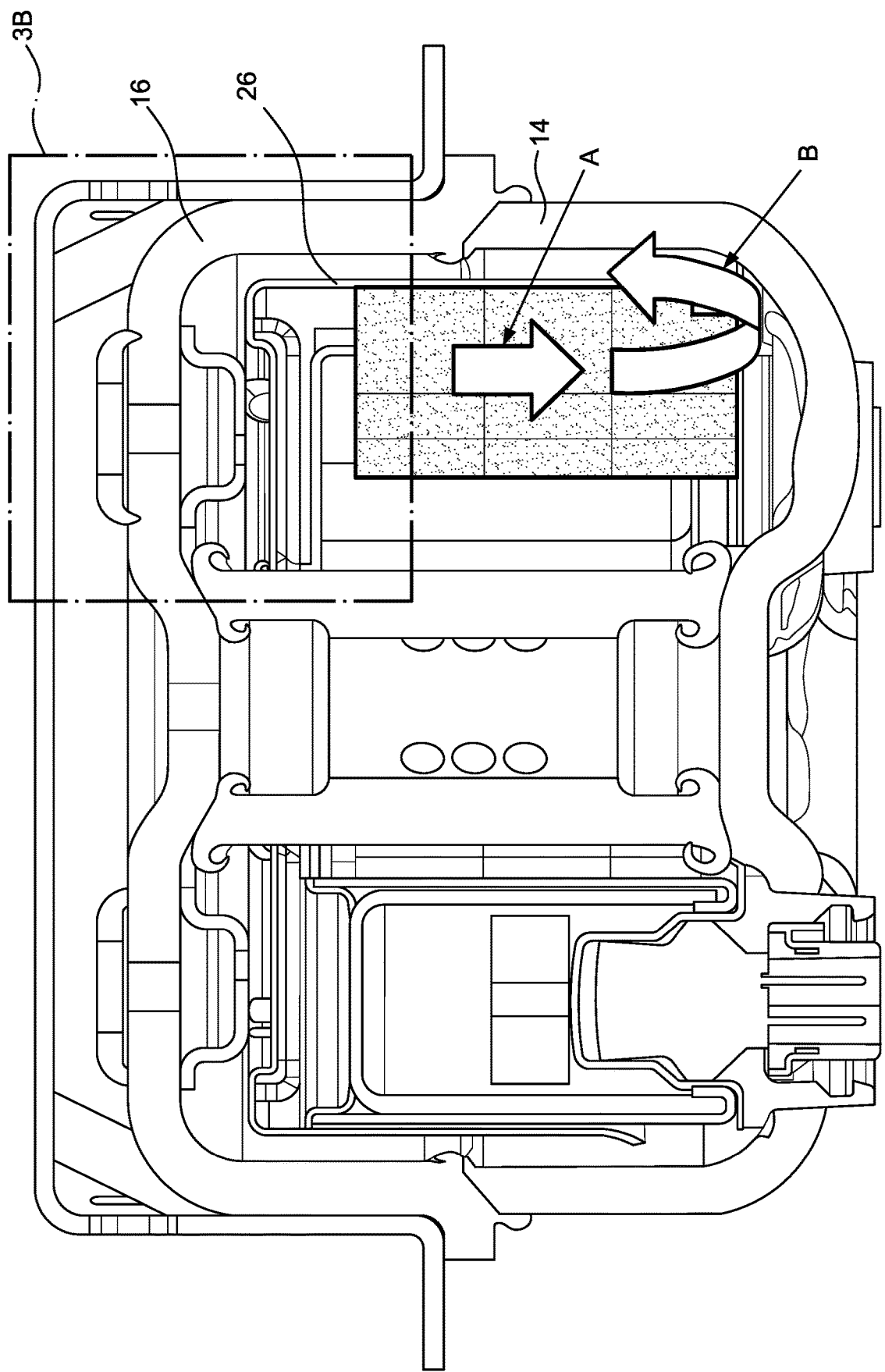
FIG. 3A is a sectional view showing an exemplary gas flow path.

With reference to FIGS. 3A and 3B, the airbag inflator 10 according to the described embodiments incorporates a unique flow path that changes direction one or multiple times. The longer more torturous flow path serves to reduce the overall amount of particulate exiting the inflator. The length of the flow path also allows more time for the last small pieces of burning propellant (i.e., propellant slivers) to complete the burning process before exiting the inflator 10. Both of these advantages reduce the risk of pin holes in the airbag cushion.

As the pyrotechnic material burns in the pressure vessel 12, the gas flows from inside the energetics cover 26 in the direction of the bottom portion 14 of the pressure vessel 12 (see arrow A in FIG. 3A). The gas flow path then turns a first 180 degrees toward the top portion 16 of the pressure vessel and between the energetics cover 26 and the pressure vessel 12 (see arrow B). As shown in FIG. 3B, after traveling up the wall of the pressure vessel 12 between the pressure vessel 12 and the energetics cover 26, the gas flow path turns a second 180 degrees back toward the bottom portion 14 of the pressure vessel and between the energetics cover 26 and the diverter (see arrow section C). Finally, the gas flow path turns a third 180 degrees into the diverter 30 through the apertures 32 toward the exit orifices 20 (see arrow section D).

The inclusion of multiple exit orifices 20 allows for a multitude of different inflator performance outcomes. As an example, in a cold temperature condition, only a portion of the orifices may be open to keep efficiencies maximized. Another example may be different orifices open at different pressures to change the mass flow rate at any given time during the deployment event. Changing the thickness on membrane 24 will change its rupture pressure. With multiple orifices, the assembly can incorporate rupturable membranes with different rupture characteristics. The internal operating pressure then determines which disks rupture. For example, at cold conditions, the internal pressure is lower than normal. That pressure could increase enough to open one rupturable membrane 24 but a second, thicker, rupturable membrane would not open.

The airbag inflator of the described embodiments is particularly suited for lower gas yield propellants. The long flow path allows time for multi-perforation grain slivers to burn up before exiting the inflator. The diverter protects the orifices against larger particles and/or debris. Additionally, changes in the diameter of the multiple orifices can allow for differing output scenarios.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An airbag inflator comprising:
   a pressure vessel including a bottom portion, a top portion and a center structure connecting the bottom portion and the top portion, the top portion including an exit orifice that is closed with a rupturable membrane;
   an energetics cover attached to the center structure, the energetics cover housing a pyrotechnic material; and
   a diverter attached to the top portion and spaced axially from the energetics cover,
   wherein the pressure vessel, the energetics cover and the diverter define a gas flow path from inside the energetics cover toward the bottom portion of the pressure vessel, the gas flow path turning a first 180 degrees toward the top portion of the pressure vessel and between the energetics cover and the pressure vessel, and the gas flow path entering the diverter axially from between the energetics cover and the diverter and exiting the pressure vessel axially.

2. An airbag inflator according to claim 1, wherein the energetics cover and the diverter further define the gas flow path turning a second 180 degrees toward the bottom portion of the pressure vessel and between the energetics cover and the diverter, and turning a third 180 degrees into the diverter toward the exit orifice.

3. An airbag inflator according to claim 1, wherein the diverter is shaped corresponding to the top portion of the pressure vessel and defines a channel across an inside surface of the top portion, the diverter including perforations in a bottom surface thereof.

4. An airbag inflator according to claim 1, wherein the pressure vessel is toroidal.

5. An airbag inflator according to claim 1, wherein the top portion of the pressure vessel comprises a plurality of exit orifices, each of the exit orifices being closed with a rupturable membrane.

6. An airbag inflator according to claim 1, further comprising a pyrotechnic holder disposed within the energetics cover and attached to one of the center structure, the energetics cover and the bottom portion of the pressure vessel, the pyrotechnic holder including a plurality of legs supporting the pyrotechnic material.

7. An airbag inflator according to claim 6, wherein the pyrotechnic material is shaped in three connected cylinders with respective central openings, and wherein the pyrotechnic material is secured on the plurality of legs via the central openings.

8. An airbag inflator according to claim 1, wherein the energetics cover comprises an open-ended cylinder with an open end facing the bottom portion of the pressure vessel and a closed end including a center aperture for attachment to the center structure of the pressure vessel.

9. An airbag inflator according to claim 8, wherein the closed end comprises an indentation facing the diverter, and wherein a space between the indentation and the diverter forms part of the gas flow path turning a second 180 degrees toward the bottom portion of the pressure vessel and in the space between the indentation in the energetics cover and the diverter.

10. An airbag inflator according to claim 9, wherein the energetics cover and the diverter further define the gas flow path turning a third 180 degrees into the diverter toward the exit orifice.

11. An airbag inflator comprising:
    a pressure vessel including a bottom portion, a top portion and a center structure connecting the bottom portion and the top portion, the top portion including an exit orifice that is closed with a rupturable membrane;
    an energetics cover attached to the center structure, the energetics cover housing a pyrotechnic material; and
    a diverter attached to the top portion,
    wherein the pressure vessel, the energetics cover and the diverter define a gas flow path from inside the energetics cover toward the bottom portion of the pressure vessel, the gas flow path turning a first 180 degrees toward the top portion of the pressure vessel and between the energetics cover and the pressure vessel, wherein the energetics cover comprises axial channels on an outside diameter defining a portion of the gas flow path between the energetics cover and the pressure vessel.

12. An airbag inflator comprising:
    a toroidal pressure vessel including a bottom portion, a top portion and a center structure connecting the bottom portion and the top portion, the top portion including a plurality of axial exit orifices that are each closed with a rupturable membrane;
    an energetics cover attached to the center structure, the energetics cover housing a pyrotechnic material; and a diverter attached to the top portion,
wherein the pressure vessel, the energetics cover and the diverter define a gas flow path from inside the energetics cover toward the bottom portion of the pressure vessel, the gas flow path making a plurality of 180 degree turns to thereby extend the gas flow path, and the gas flow path including an axial section directly between the energetics cover and the pressure vessel.

13. An airbag inflator according to claim 12, wherein the energetics cover and the diverter define the gas flow path turning a first 180 degrees toward the top portion of the pressure vessel and between the energetics cover and the pressure vessel, turning a second 180 degrees toward the bottom portion of the pressure vessel and between the energetics cover and the diverter, and turning a third 180 degrees into the diverter toward the exit orifices.

14. An airbag inflator according to claim 12, wherein the diverter is shaped corresponding to the top portion of the pressure vessel and defines a channel across an inside surface of the top portion, the diverter including perforations in a bottom surface thereof.

15. An airbag inflator according to claim 12, wherein the energetics cover comprises an open-ended cylinder with an open end facing the bottom portion of the pressure vessel and a closed end including a center aperture for attachment to the center structure of the pressure vessel.

16. An airbag inflator according to claim 15, wherein the closed end comprises an indentation facing the diverter, and wherein a space between the indentation and the diverter forms part of the gas flow path turning a second 180 degrees toward the bottom portion of the pressure vessel and in the space between the energetics cover and the diverter.

* * * * *